US008749890B1

(12) United States Patent
Wood et al.

(10) Patent No.: US 8,749,890 B1
(45) Date of Patent: Jun. 10, 2014

(54) COMPACT HEAD UP DISPLAY (HUD) FOR COCKPITS WITH CONSTRAINED SPACE ENVELOPES

(75) Inventors: Robert B. Wood, Beaverton, OR (US); Ricky J. Theriault, King City, OR (US); Duane P. M. Pond, Tigard, OR (US); Lincoln J. Burns, Portland, OR (US); Robert D. Brown, Lake Oswego, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 246 days.

(21) Appl. No.: 13/250,994

(22) Filed: Sep. 30, 2011

(51) Int. Cl.
G02B 27/14 (2006.01)

(52) U.S. Cl.
USPC .......................................................... 359/632

(58) Field of Classification Search
USPC .......................................................... 359/630
See application file for complete search history.

(56) References Cited

U.S. PATENT DOCUMENTS

| 2,141,884 | A | 12/1938 | Sonnefeld |
| 4,082,432 | A | 4/1978 | Kirschner |
| 4,178,074 | A | 12/1979 | Heller |
| 4,218,111 | A | * | 8/1980 | Withrington et al. ........... 359/13 |
| 4,232,943 | A | 11/1980 | Rogers |
| 4,309,070 | A | 1/1982 | St. Leger Searle |
| 4,711,512 | A | 12/1987 | Upatnieks |
| 4,775,218 | A | 10/1988 | Wood et al. |
| 5,341,230 | A | 8/1994 | Smith |
| 5,408,346 | A | 4/1995 | Trissel et al. |
| 5,903,395 | A | 5/1999 | Rallison et al. |
| 6,169,613 | B1 | 1/2001 | Amitai et al. |
| 6,392,812 | B1 | 5/2002 | Howard |
| 6,757,105 | B2 | 6/2004 | Niv et al. |
| 6,829,095 | B2 | 12/2004 | Amitai |
| 6,847,488 | B2 | 1/2005 | Travis |
| 7,021,777 | B2 | 4/2006 | Amitai |
| 7,027,671 | B2 | 4/2006 | Huck et al. |
| 7,123,418 | B2 | 10/2006 | Weber et al. |
| 7,181,108 | B2 | 2/2007 | Levola |
| 7,205,960 | B2 | 4/2007 | David |
| 7,319,573 | B2 | 1/2008 | Nishiyama |
| 7,391,573 | B2 | 6/2008 | Amitai |
| 7,457,040 | B2 | 11/2008 | Amitai |

(Continued)

FOREIGN PATENT DOCUMENTS

WO    WO 2011/012825    2/2011

OTHER PUBLICATIONS

Cameron, A., The Application of Holographic Optical Waveguide Technology to Q-Sight™ Family of Helmet Mounted Displays, Proc. of SPIE, 2009, 11 pages, vol. 7326.

(Continued)

*Primary Examiner* — James Jones
(74) *Attorney, Agent, or Firm* — Donna P. Suchy; Daniel M. Barbieri

(57) ABSTRACT

A head up display includes an image source, collimating optics, and a combiner. The collimating optics are disposed between the combiner and the image source. The combiner receives collimated light from the collimating optics at an input and provides the collimated light to an output. The collimating light travels from the input to the output within the combiner by total internal refraction. An input diffraction grating is disposed in a first area and an output diffraction grating is disposed in a second area. The first area is smaller than the second area.

20 Claims, 10 Drawing Sheets

(56) References Cited

U.S. PATENT DOCUMENTS

| | | | |
|---|---|---|---|
| 7,573,640 | B2 | 8/2009 | Nivon et al. |
| 7,576,916 | B2 | 8/2009 | Amitai |
| 7,577,326 | B2 | 8/2009 | Amitai |
| 7,643,214 | B2 | 1/2010 | Amitai |
| 7,672,055 | B2 | 3/2010 | Amitai |
| 7,724,441 | B2 | 5/2010 | Amitai |
| 7,724,442 | B2 | 5/2010 | Amitai |
| 7,724,443 | B2 | 5/2010 | Amitai |
| 7,733,572 | B1 | 6/2010 | Brown et al. |
| 7,751,122 | B2 | 7/2010 | Amitai |
| 7,884,985 | B2 | 2/2011 | Amitai et al. |
| 7,907,342 | B2 | 3/2011 | Simmonds et al. |
| 8,089,568 | B1 | 1/2012 | Brown et al. |
| 8,233,204 | B1 | 7/2012 | Robbins et al. |
| 2007/0019297 | A1* | 1/2007 | Stewart et al. .............. 359/630 |
| 2008/0043334 | A1 | 2/2008 | Itzkovitch et al. |
| 2008/0106775 | A1 | 5/2008 | Amitai et al. |
| 2008/0151379 | A1 | 6/2008 | Amitai |
| 2008/0186604 | A1 | 8/2008 | Amitai |
| 2008/0198471 | A1 | 8/2008 | Amitai |
| 2008/0278812 | A1 | 11/2008 | Amitai |
| 2008/0285140 | A1 | 11/2008 | Amitai |
| 2009/0019222 | A1 | 1/2009 | Verma et al. |
| 2009/0052046 | A1 | 2/2009 | Amitai |
| 2009/0052047 | A1 | 2/2009 | Amitai |
| 2009/0097127 | A1 | 4/2009 | Amitai |
| 2009/0122414 | A1 | 5/2009 | Amitai |
| 2009/0128911 | A1 | 5/2009 | Itzkovitch et al. |
| 2009/0153437 | A1 | 6/2009 | Aharoni |
| 2009/0237804 | A1 | 9/2009 | Amitai et al. |
| 2010/0171680 | A1 | 7/2010 | Lapidot et al. |
| 2010/0246004 | A1 | 9/2010 | Simmonds |
| 2010/0246993 | A1 | 9/2010 | Rieger et al. |
| 2011/0026128 | A1 | 2/2011 | Baker et al. |
| 2011/0050548 | A1 | 3/2011 | Blumenfeld et al. |
| 2012/0127577 | A1* | 5/2012 | Desserouer .............. 359/566 |

OTHER PUBLICATIONS

Wisely, P.L., Head up and head mounted display performance improvements through advanced techniques in the manipulation of light, Proc. of SPIE, 2009, 10 pages, vol. 7327.

Office Action for U.S. Appl. No. 13/250,621, mail date May 21, 2013, 10 pages.

Office Action for U.S. Appl. No. 13/250,940, mail date Mar. 12, 2013, 11 pages.

Office Action for U.S. Appl. No. 13/250,970, mail date Jul. 30, 2013, 4 pages.

Office Action for U.S. Appl. No. 13/250,940, mail date Aug. 28, 2013, 15 pages.

Office Action for U.S. Appl. No. 13/250,858 Dated Feb. 19, 2014, 13 pages.

* cited by examiner

COMPACT HEAD UP DISPLAY (HUD) FOR COCKPITS WITH CONSTRAINED SPACE ENVELOPES

CROSS REFERENCE TO RELATED APPLICATIONS

The present application is related to: U.S. patent application Ser. No. 13/250,940, entitled, "Head Up Display (HUD) Utilizing Diffractive Gratings Having Graded Efficiency," filed on an even date herewith, incorporated herein by reference in its entirety, and assigned to the assignee of the present application; U.S. patent application Ser. No. 13/250,858, entitled, "Ultra-Compact HUD Utilizing Waveguide Pupil Expander With Surface Relief Gratings In High Refractive Index Materials," filed on an even date herewith, incorporated herein by reference in its entirety, and assigned to the assignee of the present application; U.S. patent application Ser. No. 13/251,087, entitled, "System for and Method of Extending Vertical Field of View in Head Up Display Utilizing a Waveguide Combiner," filed on an even date herewith, incorporated herein by reference in its entirety, and assigned to the assignee of the present application; U.S. patent application Ser. No. 13/250,970, entitled, "System For and Method of Stowing HUD Combiners," filed on an even date herewith and assigned to the assignee of the present application, incorporated herein by reference in its entirety; and U.S. patent application Ser. No. 13/250,621, Issued U.S. Pat. No. 8,634,139, entitled, "System for and Method of Catadioptric Collimation in a Compact Head Up Display (HUD)," filed on an even date herewith, incorporated herein by reference herein in its entirety and assigned to the assignee of the present application.

BACKGROUND OF THE INVENTION

The present specification relates to displays. More particularly, the present specification relates to head up displays (HUDs).

HUDs provide significant safety and operational benefits including precise energy management and conformal flight path. These safety and operational benefits are enjoyed by operators of air transport aircraft, military aircraft, regional aircraft and high end business jets where HUD are generally employed. These safety and operational benefits are also desirable in smaller aircraft.

Conventional HUDs are generally large, expensive and difficult to fit into smaller aircraft, such as, business and regional jets as well as general aviation airplanes. Often, conventional HUDs rely on large optical components to form adequate field of view and viewing eye box. The large optical components include lens, prisms, mirrors, etc. The volume of the packages including the optical and electronic components of the HUD are too large to fit within the constrained space in the cockpit of smaller aircraft. Further, conventional HUDs rely upon optical components and electronic components which are generally too expensive for the cost requirements of smaller aircraft. Further still, stow away and breakaway mechanisms of conventional HUDs are not adequate for the constrained space in the cockpit of smaller aircraft.

Therefore, there is a need for a compact HUD for small aircraft, such as small business jets. Further, there is a need for a compact HUD which reduces HUD stowage and breakaway issues associated with a smaller cockpit. Yet further, there is a need for a HUD that allows easy ingress/egress in a space constrained environment. Yet further still, there is also a need for a lightweight, lower cost HUD optimized for smaller cockpits. Yet further, there a substrate waveguide HUD which is low cost and occupies a small volume. Still further, there is a need for lower cost, and smaller size HUD which uses less power.

SUMMARY OF THE INVENTION

An exemplary embodiment relates to a head up display. The head up display includes a micro display image source, collimating optics, and a combiner. The collimating optics are disposed between the combiner and the image source. The collimating optics are capable of providing a field of view of at least 30 degrees horizontally by 18 degrees vertically. The combiner receives collimated light from the collimating optics at an input and provides the collimated light to an output. The collimating light travels from the input to the output within the combiner by total internal reflection. An input diffraction grating is disposed in a first area and an output diffraction grating is disposed in a second area. The first area is smaller than the second area.

Another exemplary embodiment relates to a method of displaying information on a head up display. The method includes collimating light from an image source using collimating optics. The collimating optics are capable of providing a field of view of at least 30 degrees horizontally by 18 degrees vertically. The method also includes diffracting the collimated light into a transparent substrate waveguide at an input, propagating the collimated light through the substrate waveguide to an output, and diffracting the collimated light from the substrate waveguide at the output to the pilot. A pupil is expanded in at least one direction by the substrate waveguide.

Another embodiment relates to a head up display for providing an image from an image source. The display includes collimating optics having a first exit aperture of a first size, and a combiner. The combiner receives collimated light from the collimating optics at an input and provides the collimated light to an output. The collimating light travels from the input to the output within the combiner by total internal reflection. The combiner has a second exit aperture of a second size. The second size is larger than the first size.

The head up display also includes a stow mechanism for aligning the combiner to the collimating optics when in an operational position and for moving the combiner out of a pilot's view in a stowed position when the HUD is not in use. When moving from the operational position to the stowed position, the combiner rotates in a clockwise or counter clockwise direction when viewed from a position of a pilot. The stow mechanism is also for moving the combiner out of a head path in a crash event.

BRIEF DESCRIPTION OF THE DRAWINGS

Exemplary embodiments are hereafter described with reference to the accompanying drawings, wherein like numerals denote like elements; and.

DETAILED DESCRIPTION OF THE PREFERRED EMBODIMENTS

Figure 1:
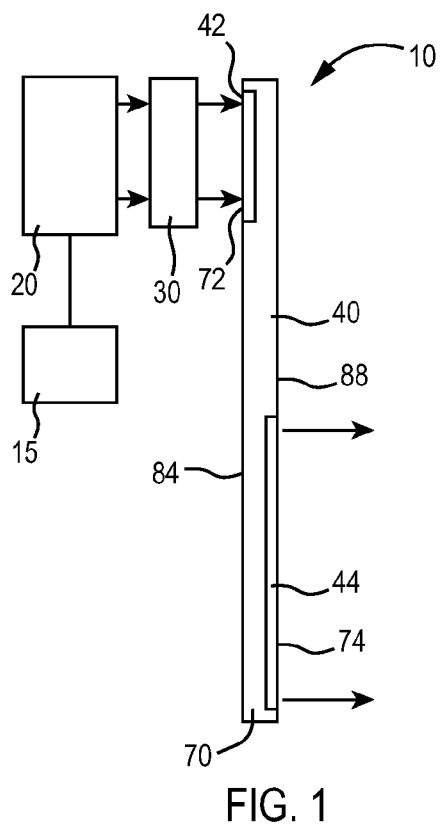
FIG. 1 is a general block diagram of a head up display (HUD) system in accordance with an exemplary embodiment.

Before describing in detail the particular improved system and method, it should be observed that the invention includes, but is not limited to, a novel structural combination of optical, mechanical, and electronic components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, head up display (HUD) system 10 can be utilized in various applications, including aviation, medical, naval, targeting, ground based, military, etc. HUD system 10 is preferably configured for use in smaller cockpit environments and yet provides an appropriate field of view and eye box for avionic applications.

HUD system 10 preferably includes an image source 20 and a substrate waveguide 40. Image source 20 can be any device for providing an image including but not limited to a CRT display, an LED display, an active matrix liquid crystal display (LCD), etc. In a preferred embodiment, image source 20 is a micro LCD assembly and can provide linearly polarized light.

In addition, system 10 can include collimating optics 30 disposed between substrate waveguide 40 and image source 20. Collimating optics 30 can be a single optical component, such as a lens, or include multiple optical components. Collimating optics 30 can be any optical component or configuration of optical components that provide light (preferably collimated light) from image source 20 to substrate waveguide 40. Collimating optics 30 can be integrated with or spaced apart from image source 20 and/or substrate waveguide 40.

In operation, system 10 provides images from image source 20 to a pilot or other operator so that the pilot can simultaneously view the images and a real world scene. The images can include graphic and/or text information (e.g., flight path vector, etc.) related to avionic information in one embodiment. In addition, the images can include synthetic or enhanced vision video images. System 10 can include display processing electronics 15 such as a HUD computer and at least one display processor. Processing electronics 15 computes and generates real-time graphics for display on image source 20. The real-time graphics can include key information needed by the pilot to operate the aircraft. The raw data required to generate the real-time graphics is provided by aircraft sensors and systems. Display processing electronics 15 computes and positions a flight vector symbol and other symbols that are designed to overlay the real world scene as viewed by the pilot through waveguide 40. Processing electronics 15 also performs I/O processing to ensure the integrity of the real-time graphics. In one embodiment, collimated light representing the image from image source 20 is provided on substrate waveguide 40 so that the pilot can view the image conformally on the real world scene through substrate waveguide 40. Waveguide 40 is preferably transparent for viewing the real world scene through main surfaces or sides 84 and 88.

Figure 3:
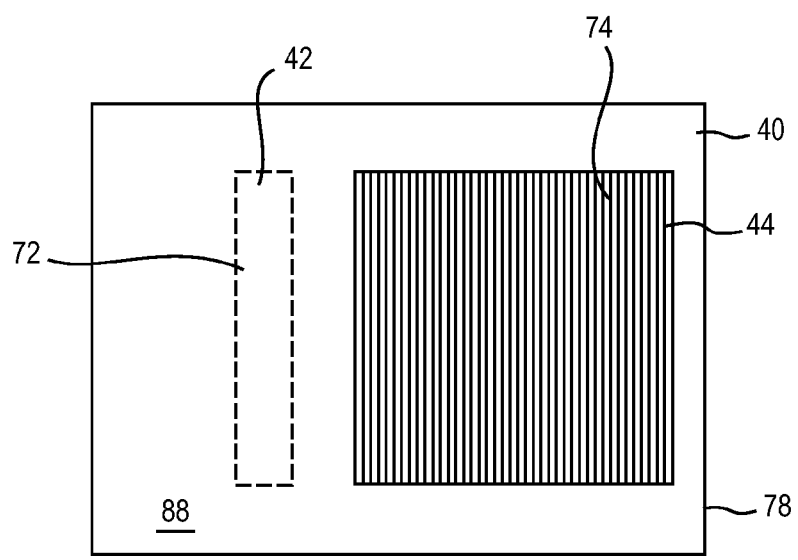
FIG. 3 is a top view schematic drawing of a waveguide for the system illustrated in FIG. 1 in accordance with yet another exemplary embodiment.

With reference to FIGS. 1 and 3, waveguide 40 includes an input diffraction grating 42 and an output diffraction grating 44. Gratings 42 and 44 can be a gradient output coupling grating that provides excellent image quality and acceptable brightness in a preferred embodiment. Gratings 42 and 44 are preferably implemented as surface relief gratings in a high refractive index (e.g., N≥1.5) dielectric materials, thereby enabling wider field of view with acceptable luminance. Gratings 42 and 44 can be implemented according to a number of techniques. In a preferred embodiment, gratings 42 and 4 are surface relief gratings fabricated using lithographic mastering in a wafer foundry.

Applicants have found that surface relief gratings formed by lithographic mastering can have better performance in avionic HUD applications over holographic gratings. Surface relief gratings can be formed in high refractive index materials, such as, inorganic glass materials, thereby enabling wide field of view with acceptable luminescence. In a preferred embodiment, gratings 42 and 44 are etched directly in an inorganic high index material (e.g., glass material having refractive index of diffraction, N≥1.5) using reactive ion etching (RIE). This replication can utilize a step and repeat process with less than 100 nanometers repeatability.

Substrate waveguide 40 can be a single glass plate 78 or can be made from two or more fixed glass plates. Substrate waveguide 40 can have a variety of shapes including generally rectangular, oval, circular, tear drop-shaped, hexagonal, rectangular with rounded corners, square-shaped, etc.

In operation, substrate waveguide 40 advantageously receives light from image source 20 provided through collimating optics 30 at an input 72 and provides light to a user at its output 74. Image source 20 provides information using a single color of light (e.g., green light approximately between 525 and 550 nanometers (nm)). Light provided to substrate waveguide 40 is preferably linearly or S polarized and collimated. Alternatively, other polarization, multiple colors, or other colors at different wavelengths can be utilized without departing from the scope of the invention.

Substrate waveguide 40 preferably performs two operations in a preferred embodiment. First, substrate waveguide 40 is disposed to provide a medium for transporting light by total internal reflection from input 72 to output 74. Light is reflected multiple times off of opposing main sides 84 and 88 of substrate 40 as it travels from input 72 to output 74. Second, substrate waveguide 40 operates as a combiner allowing the user to view the light from image source 20 at output 74 and light from the real world scene through sides 84 and 88.

Light from collimating optics 30 first strikes diffraction grating 42 at input 72 on side 84 of substrate waveguide 40. Grating 40 diffracts light toward the length of substrate 40 so that it travels by total internal reflection to output 74 on side 84. At output 74, diffraction grating 44 diffracts the light toward the user and out of the substrate waveguide 40. Diffraction grating 42 at input 72 preferably has a greater efficiency than diffraction grating 44 at output 74. In one example, grating 42 has an efficiency of as high as possible (e.g., 50 percent or greater) and grating 44 has an efficiency low enough to provide a uniform image across output 74.

Figure 2:
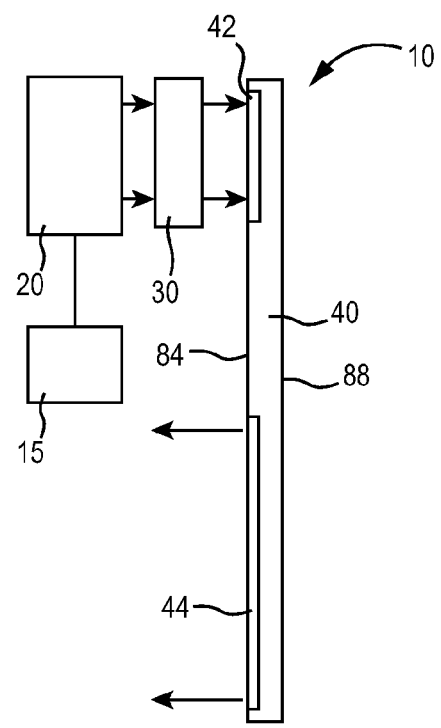
FIG. 2 is a general block diagram of a HUD system in accordance with another exemplary embodiment.

With reference to FIG. 1, diffraction gratings 42 and 44 are disposed on respective opposing sides 84 and 88 of substrate waveguide 40 in one embodiment. With reference to FIG. 2, gratings 42 and 44 can also be formed on the same side 84 of waveguide 40 in one alternative embodiment.

With reference to FIG. 3, a single glass plate 78 of inorganic glass material is utilized for substrate waveguide 40. The thickness of glass material is dependent upon field of view and parameters associated with collimating optics 30. Gratings 42 and 44 are surface relief gratings directly formed on respective sides 84 and 88 according to one embodiment.

With reference to FIG. 3, diffraction gratings 42 and 44 are preferably disposed in respective areas that are rectangular in shape and have the same width as each other in one embodiment. Alternatively, gratings 42 and 44 can have different widths. Grating 44 has a greater height than grating 42 in one embodiment.

Gratings 42 and 44 preferably have a period of 330 nm (plus or minus 20 percent) nanometers. Grating 42 preferably has a trench depth of 100-150 nm, and grating 44 has a trench depth of 50-100 nm in one embodiment. Both gratings 44 and 42 preferably have a 40-70% duty cycle.

Figure 4:
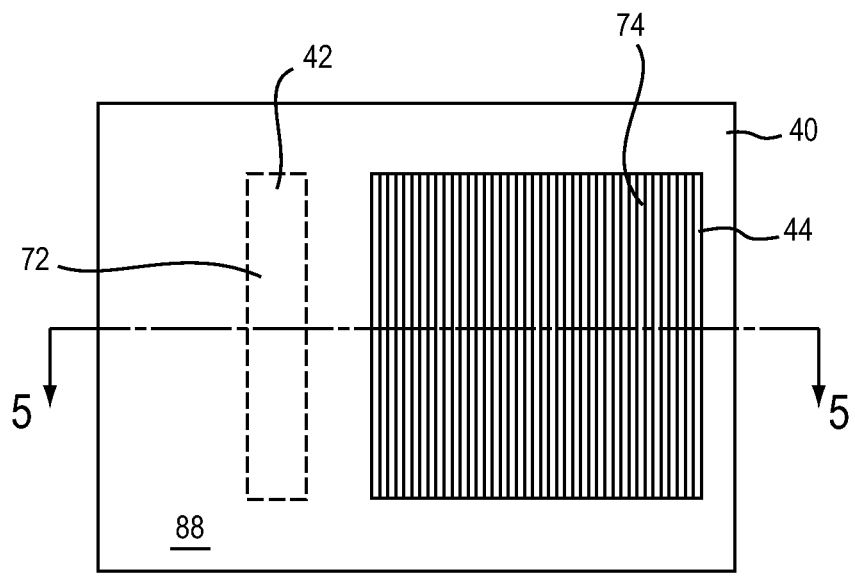
FIG. 4 is a top view schematic drawing of a waveguide for the system illustrated in FIG. 1 in accordance with still another exemplary embodiment.
Figure 5:
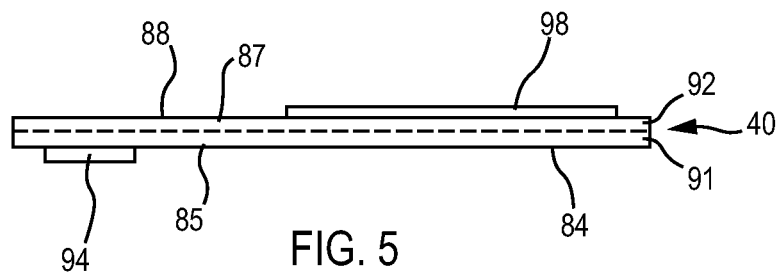
FIG. 5 is a cross sectional view schematic drawing of the waveguide illustrated in FIG. 4 along line 5-5.

With reference to FIGS. 4 and 5, substrate waveguide 40 can be made from two equal sized Schott N-Lak8 glass plates 91 and 92 adhered together by optical adhesive or contact bond in one embodiment. Glass plates 78, 91 and 92 can be rectangular in cross-sectional area.

With reference to FIGS. 4 and 5, diffraction gratings 42 and 44 are preferably disposed in respective areas that are rectangular in shape with the same width as each other in one embodiment. Both gratings 40 and 42 are disposed on fused silica wafers 94 and 98 in one embodiment.

In one preferred embodiment, system 10 is configured to expand the pupil of system 10 in a single axis (e.g., in the vertical direction). In one embodiment, substrate waveguide 40 provides an approximately 100 mm vertical ×75 mm horizontal exit pupil. Waveguide 40 can effect the single axis pupil expansion. The single axis expansion can be on the order of 3 to 8 times (e.g, approximately 5.8 times in one preferred embodiment). Other orders of pupil expansion are possible depending upon performance criteria, design parameters, and optical components utilized without departing from the scope of the invention.

Figure 6:
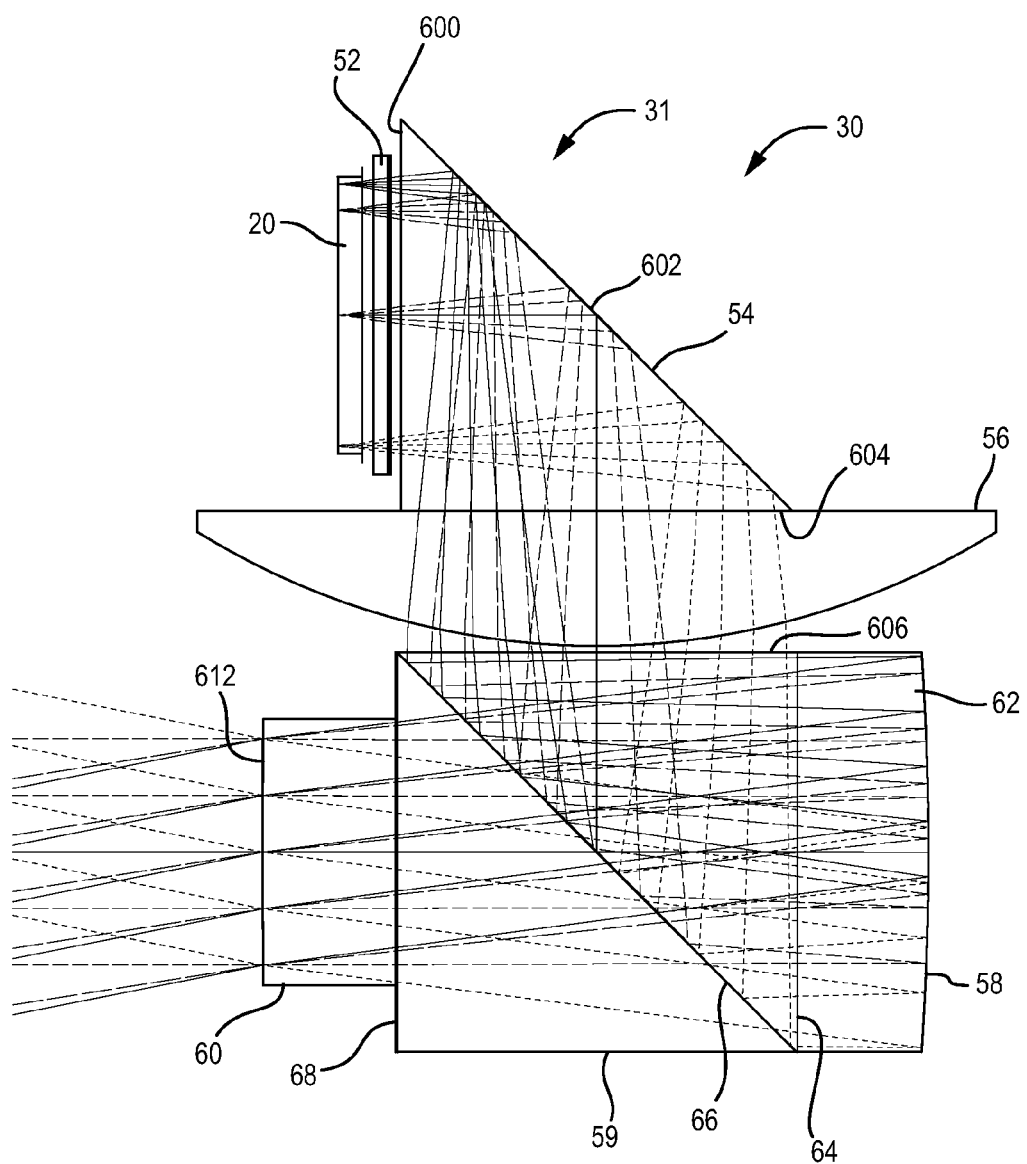
FIG. 6 is a side view schematic drawing of collimating optics for the system illustrated in FIG. 1 in accordance with another exemplary embodiment.

With reference to FIG. 6, collimating optics 30 can be an assembly 31 disposed adjacent to image source 20 in accordance with on embodiment. Assembly 31 of collimating optics 30 is preferably a catadioptric folded collimator system and includes a fold prism 54, a field lens 56, a beam splitter 59, a curved mirror 58 and a corrective lens 60. Corrective lens 60 is disposed to provide collimated light to diffraction grating 42 (FIG. 1). Fold prism 54 receives polarized light from image source 20 at a face 600.

The light received at face 600 from image source 20 is reflected from a surface 602 of prism 54 to an exit surface 604. Exit surface 604 is disposed to provide light to field lens 56. Field lens 56 provides light to an input surface 606 of beam splitter 59. Field lens 56 is preferably configured as a field flattener lens, such as a plano-convex spherical lens. Alternatively, fold prism 54 can be a mirror or include a mirrored surface. In alternative embodiment, fold prism 54 is not required for assembly 31 and lens 64 can receive light directly from image or source 20.

Beam splitter 59 is preferably configured as a polarizing beam splitter. Curved mirror 58 includes a curved reflective surface 62. Surface 62 provides a catoptric element which in conjunction with a refractive (dioptric) element, such as, lens 60, provides a catadioptric system. Corrective lens 60 is preferably an aspheric lens. Curved reflective surface 62 is preferably an aspheric surface.

Beam splitter 59 provides a folded optical path and can include a retarder film 64, an internal partially reflective surface 66 and a retarder film 68. Film 64 can be a quarter wave retarder film, and film 68 can be a one half wave retarder film. Films 68 and 64 preferably control the polarization states for efficient light transmission. Film 68 can be optional depending on polarization characteristics of down stream optics.

Light received at partially reflective internal surface 66 of splitter 59 from input surface 606 is reflected through film 64 to curved surface 62. Light reflecting from surface 62 is provided through film 64, partially reflective internal surface 66, and film 68 to corrective lens 60. A combination of elements in collimating optics 30 collimates light at an exit pupil 612 associated with corrective lens 60. The collimating optics 30 embodied as a catadioptric system advantageously assists in making the design of HUD system 10 nearly 10 times smaller in volume in one embodiment.

Assembly 31 of collimating optics 30 as embodied in FIG. 6 advantageously provides a relatively low optical element count with a short focal length. The f ratio (the ratio of pupil diameter to focal length) is kept very low in a preferred embodiment. In addition, assembly 31 of collimating optics 30 as embodied in FIG. 6 efficiently handles polarized light and provides a compact high performance collimating solution.

In one embodiment, collimating optics 30 can provide a 30 degree field of view from image source 20 embodied as a 1.3 inch diagonal LCD which translates into a focal length of approximately 2 inches. Exit pupil 612 is preferably wide enough to allow biocular viewing (e.g., approximately 3 inches which forces the f ratio to be approximately 0.67 or 2/3). In one embodiment, optics 30 provide a field of view of 30 degrees horizontally by 22 degrees vertically. An exemplary exit aperture for optics 30 is rectangular having dimensions of 4 inches×1 inch which can be extended to be 4 inches by 4 inches by waveguide 40. Assembly 31 of collimating optics 30 advantageously provides excellent performance, meeting requirements for efficiency, color correction and collimation accuracy.

In one embodiment, exit pupil 612 from lens 60 is truncated to 17 millimeters vertical by 75 millimeters horizontal.

This truncation allows system 10 to be folded into a very compact volume. Advantageously, substrate waveguide 40 provides pupil expansion in one direction to achieve a 100 millimeter vertical by 75 millimeter horizontal pupil in one embodiment. Assembly 31 preferably has a cross section that is only approximately 50 millimeters×85 millimeters or less in one embodiment.

Figure 7:
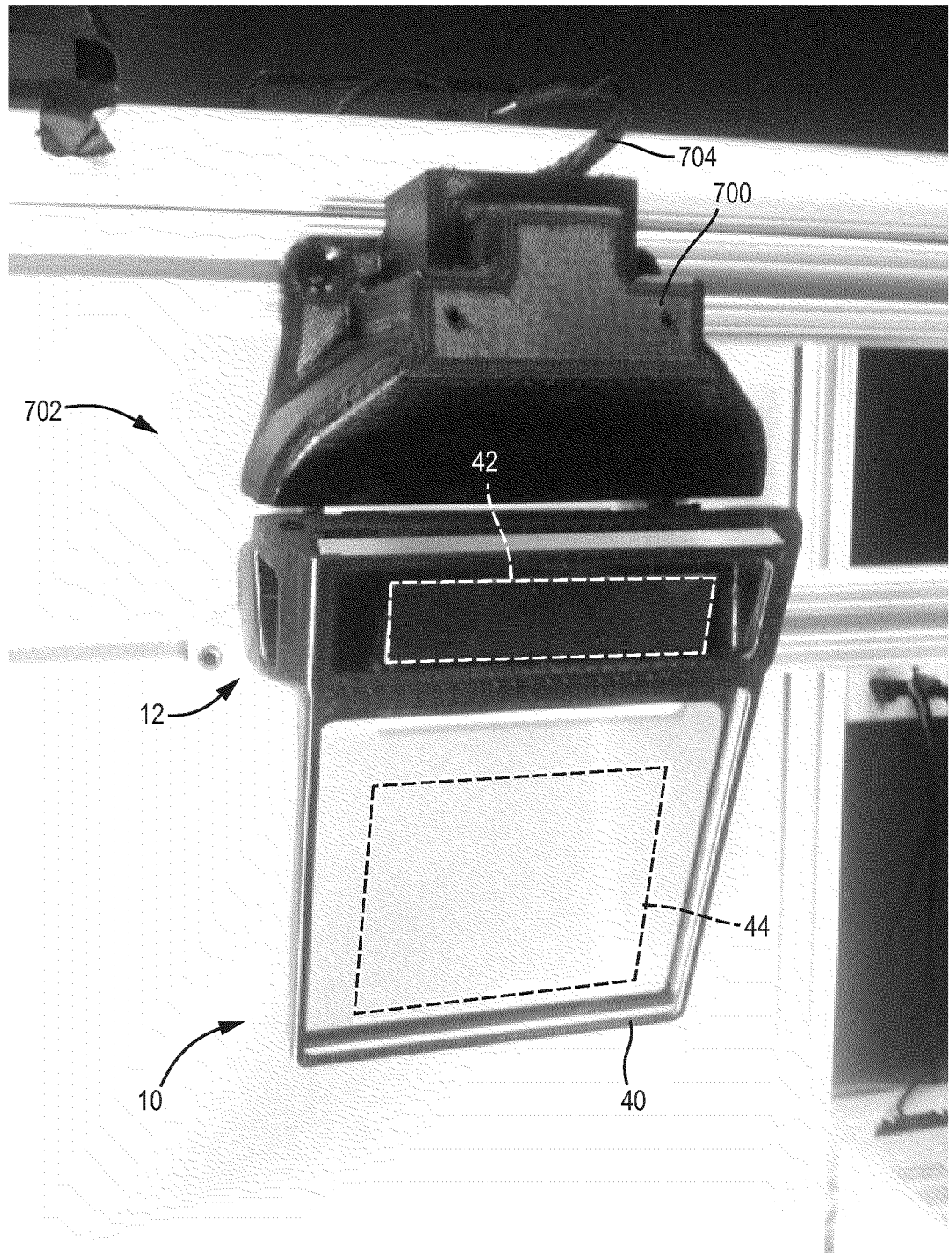
FIG. 7 is a perspective view schematic illustration of an embodiment of the HUD system illustrated in FIG. 1 and attached to a bracket in accordance with another exemplary embodiment.
Figure 8:
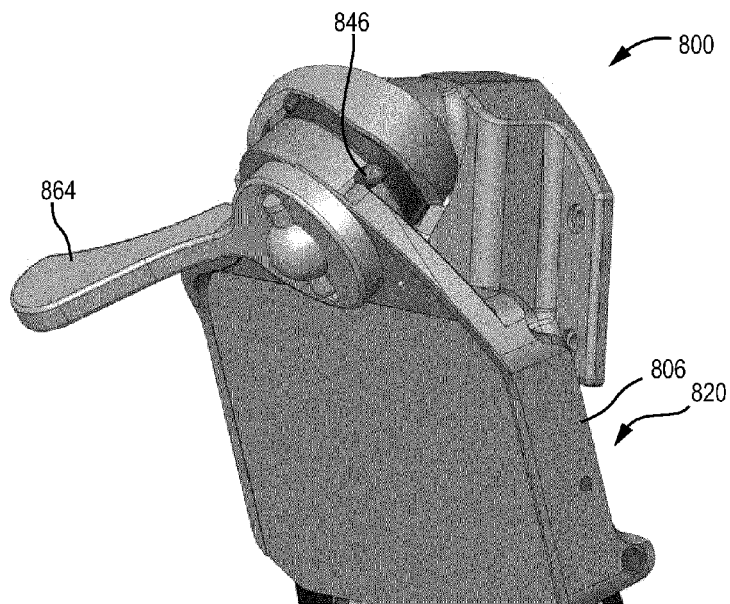
FIG. 8 is a perspective view schematic drawing of a stow mechanism for use with an embodiment of the HUD system illustrated in FIG. 1 in accordance with another exemplary embodiment.
Figure 9:
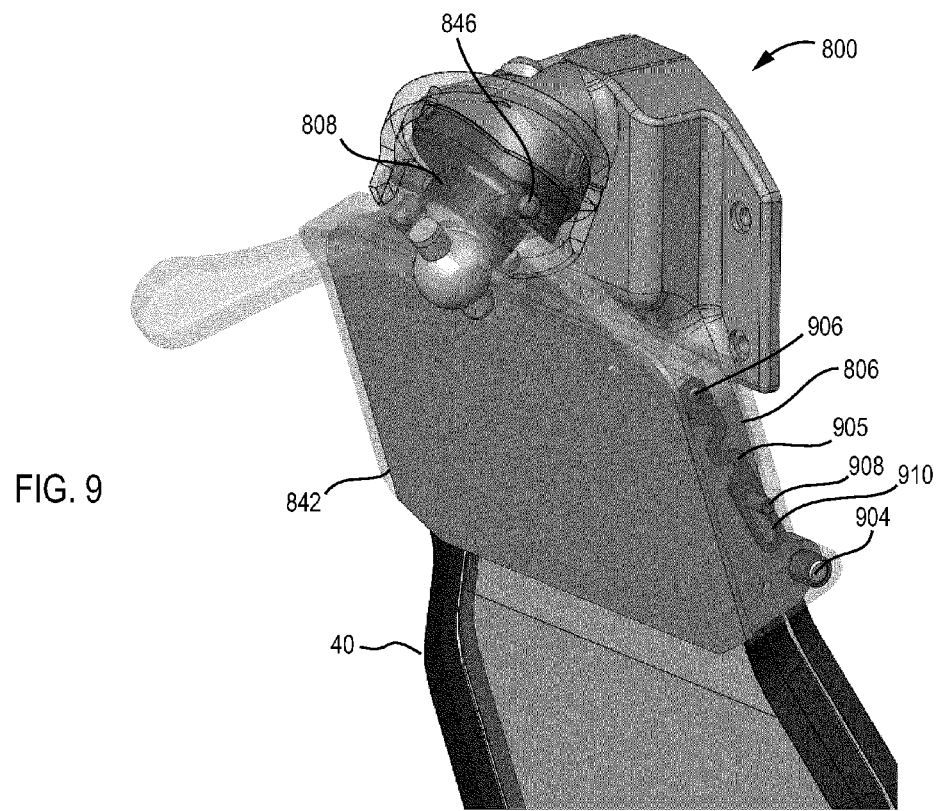
FIG. 9 is a perspective partial cut away view schematic drawing of the stow mechanism illustrated in FIG. 8 showing a spherical bearing in accordance with another exemplary embodiment.

With reference to FIG. 7, HUD system 10 can be packaged as a compact HUD system 702 including substrate waveguide 40 and a fixed bracket 700. Bracket 700 includes portion 703 including image source 20, and optical components of collimating optics 30. Bracket 700 also includes a portion 702 including the remaining optical components in collimating optics 30. Image source 20 receives data from a HUD computer via wiring 704 associated with bracket 700. Bracket 700 can be coupled to the frame of a cockpit. The specific shape and structure of system 702 is not shown in a limiting fashion.

Figure 10:
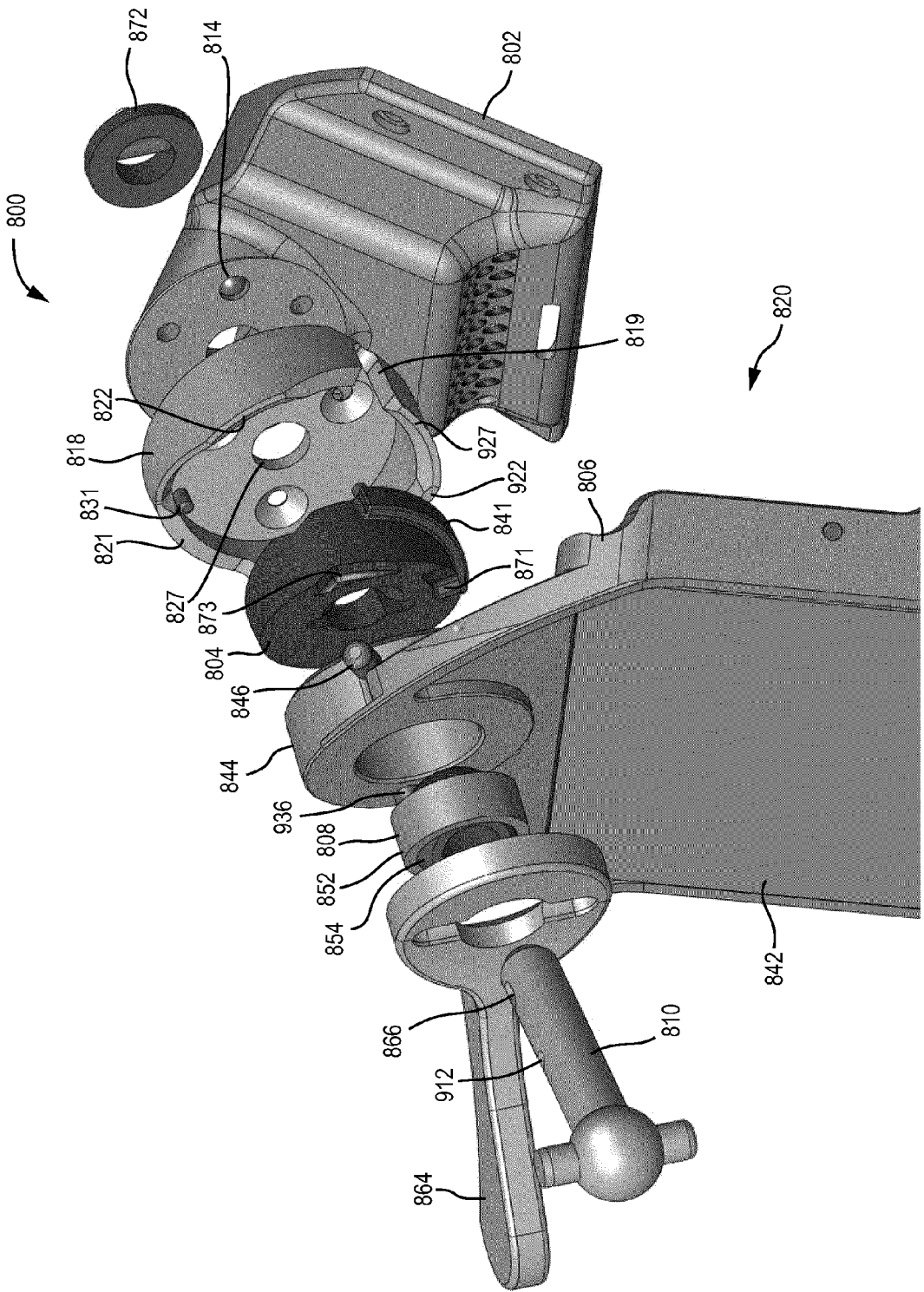
FIG. 10 is an expanded perspective view schematic drawing of the stow mechanism illustrated in FIG. 8.
Figure 11:
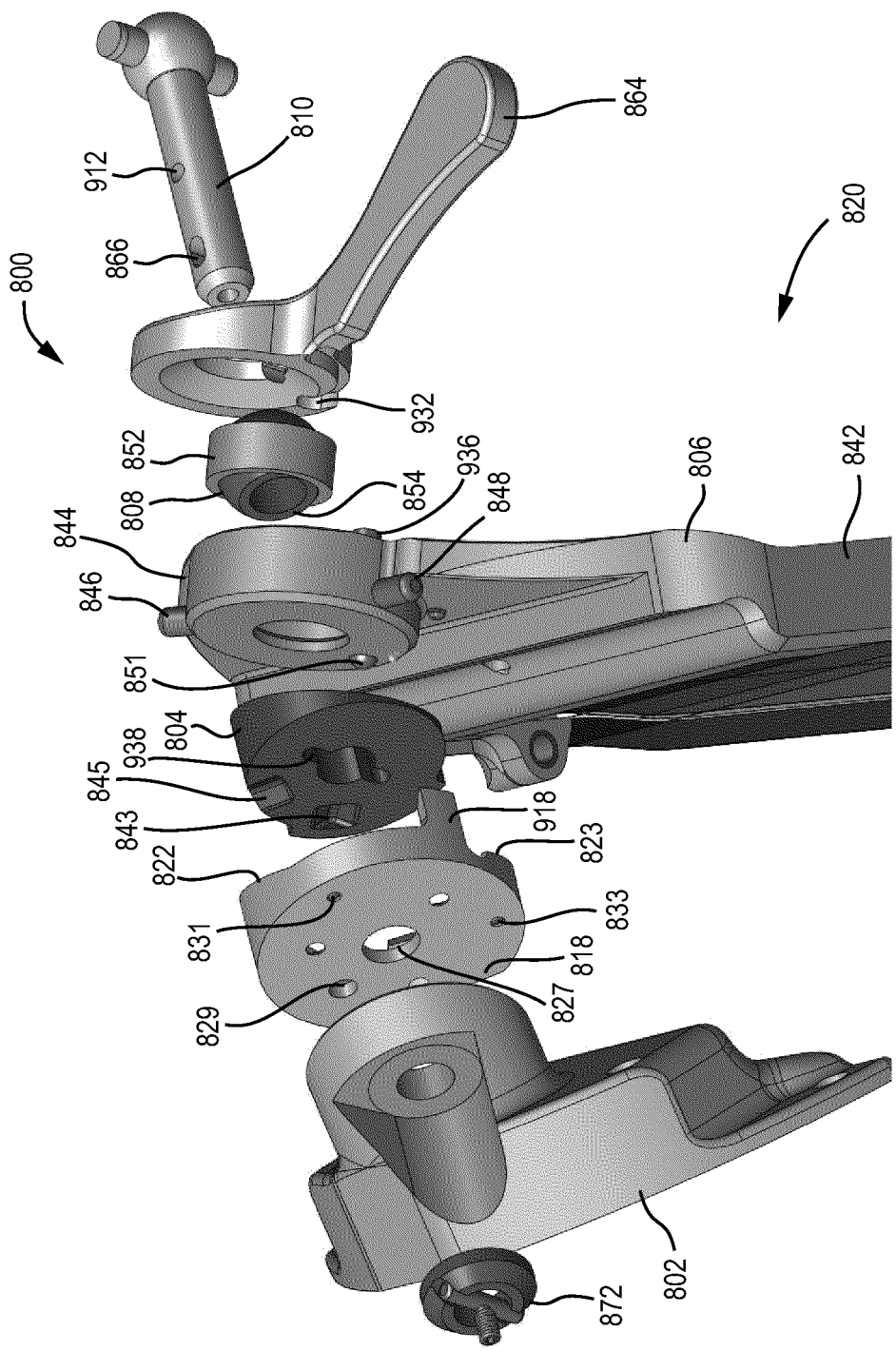
FIG. 11 is another expanded perspective view schematic drawing of the stow mechanism illustrated in FIG. 8.
Figure 12:
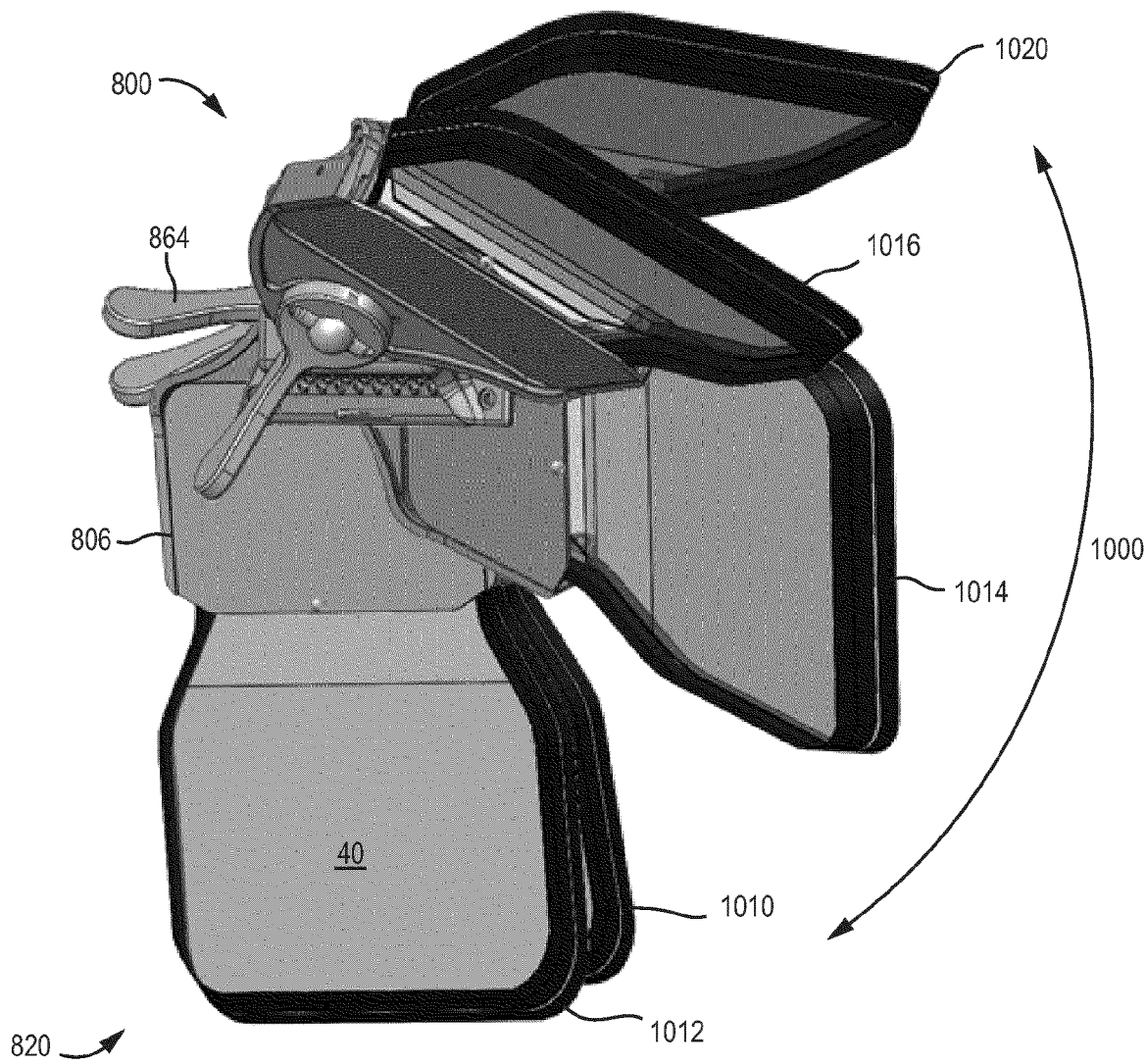
FIG. 12 is a perspective view schematic drawing of the stow mechanism illustrated in FIG. 8 in five positions across a stow path in accordance with another exemplary embodiment.

With reference to FIGS. 8-12, HUD system 10 (FIG. 1) can be packaged as a compact HUD system 820 (FIG. 12). HUD system 820 can be attached to a stow mechanism 800. The specific shape and structure of system 820 is not shown in a limiting fashion. Stow mechanism 800 can be used with other line replaceable units (LRUs) as well as other types of HUDs.

Stow mechanism 800 advantageously operates across a stow path 1000 (FIG. 12) that encompasses more than one degree of freedom to accommodate constrained envelopes associated with smaller cockpits. Substrate waveguide 40 rotates over two or more axes as it travels to and from an operational position 1010 and stow position 1020 in stow path 1000. In operational position 1020, waveguide 40 is preferably deployed for HUD operations and is properly aligned with collimating optics 30 (FIG. 6).

Unlike conventional designs which provide rotation of the HUD combiner about a single axis, stow mechanism 800 allows HUD system 820 to have stow path 1000 that avoids a pilot's head in small cockpit environments and yet is not too bulky or expensive according to one embodiment. In a preferred embodiment, stow path 1000 does not pass through a head location of the pilot and can be operated by the pilot with one hand.

With reference to FIGS. 10 and 11, stow mechanism 800 includes a bracket 802, a wedge 804, a combiner arm 806, a spherical bearing 808, and a shaft 810. Substrate waveguide 40 (FIG. 12) is preferably contained in combiner receiver 842 mounted inside a combiner arm 806. Collimating optics 30 (e.g., assembly 31) and source 20 (FIG. 6) can be housed in a portion of a housing (not shown) located behind bracket 802.

Bracket 802 is configured for attachment to the collimating optics housing (not shown). Bracket 802 includes a cam 818 with a rim 822 having a stow recess 819, a recess 821, and an operational recess 823. Rim 822 also include a tab 918.

Cam 818 has an aperture 827 for receiving shaft 810 and an aperture 829 through which a spring loaded ball bearing 814 on bracket 802 protrudes. Cam 818 also included posts 831 and 833 (FIG. 11). Cam 818 is preferably attached by fasteners to bracket 802 and can be metal material.

Wedge 804 is received in cam 818 of bracket 802. Wedge 804 is cylindrical and has height that is greater on one side than the opposite side. Wedge 804 includes a tab 841 that slides within cam 818 and engages post 831 when turned counter clockwise and post 833 when turned clockwise. Wedge 804 includes an operational detent 871 and a stow dent 873 on a side facing combiner arm 806 and detent 843 and a detent 845 on a side facing cam 818. Detents 843 and 845 engage bearing 814 as explained below.

Combiner arm 806 includes a receiver 842 for attachment to waveguide 40 and a collar portion 844. Collar portion 844 includes pin members 846, 848, and 936. Collar portion 844 sits on top of wedge 804 and includes a spring loaded ball bearing 851. Combiner arm 806 holds waveguide 40 optically aligned with and at a gap from lens 60 (FIG. 6) when in an operational position 1010 (FIGS. 12 and 13) in one embodiment. HUD system 820 advantageously does not require as accurate of alignment of image source 20 to waveguide 40, thereby allowing less critical tolerances for stow mechanism 800.

Figure 13:
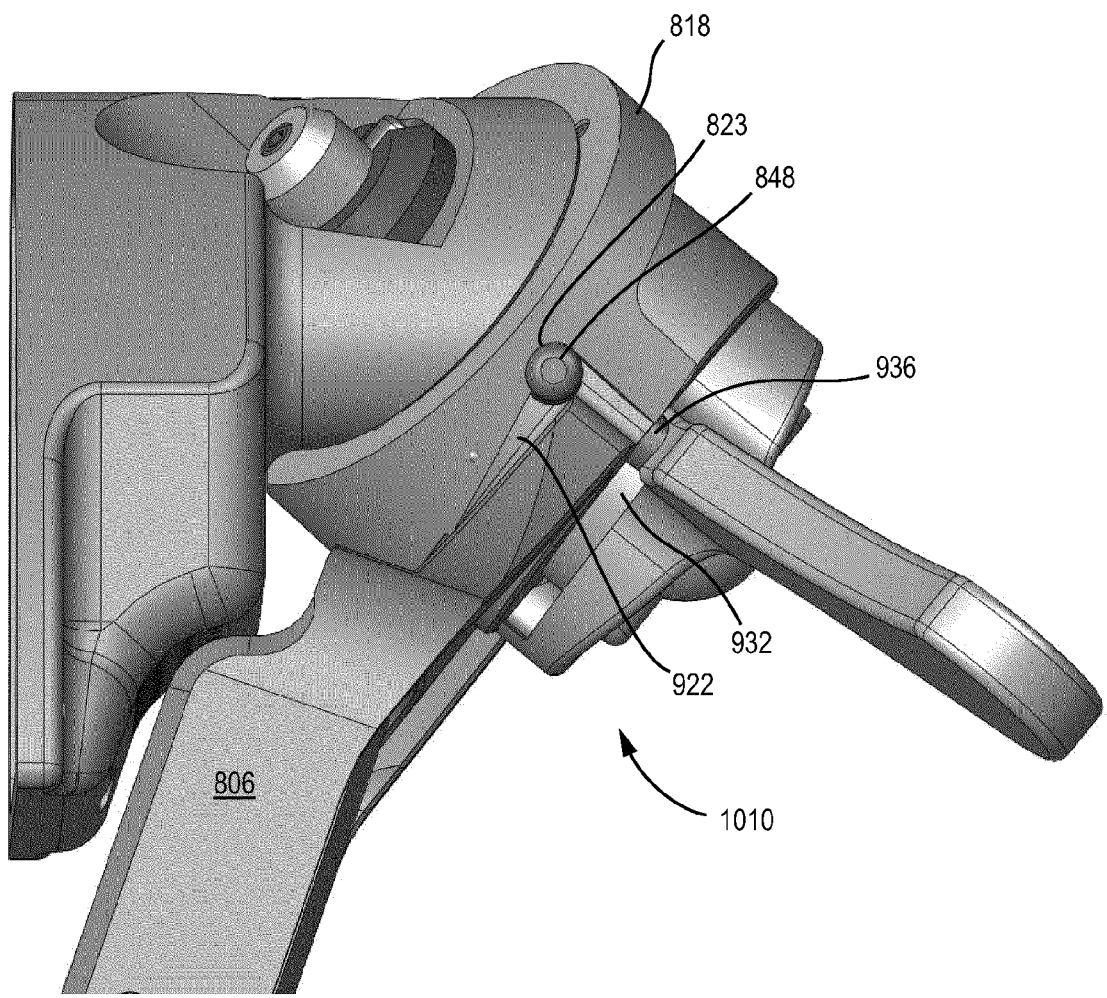
FIG. 13 is another perspective view schematic drawing showing the stow mechanism illustrated in FIG. 8 in an operational position in accordance with another exemplary embodiment.

Shaft 810 can be integrated with or attached to a handle 864. Handle 864 includes a recessed groove 932 configured to receive a pin 936 on combiner arm 806. Pin 948 locks combiner arm 806 into recess 823 of cam 818 (FIG. 13) when mechanism is in operational position 1010 (FIG. 13). Shaft portion 862 is disposed through spherical bearing 808, collar portion 844, wedge 804, cam 818, and into bracket 802. A shaft retaining ring 872 locks shaft 810 to bracket 802 at an aperture 866. Shaft 810 is rotatable within aperture 827 of cam 818 but is held at a fixed angle within bracket 802. Shaft 810 is fixed to wedge 804 via a pin (not shown) sitting in aperture 938 (FIG. 11) of wedge 804 and extending through aperture 912 of shaft 810.

Bearing 802 includes an outer collar 852 aligned with collar portion 844 of combiner arm 806 and an inner collar 854 aligned with shaft portion 810. Collar bearing 802 allows combiner arm 806 to move in more than one degree of freedom with respect to shaft 810.

In operation, stow mechanism 800 allows substrate waveguide 40 to change attitude in three rotational degrees of freedom about shaft 810. Spherical bearing 808 allows collar portion 844 to rotate in three degrees of motion with respect to shaft portion 810 and bracket 802 due to the movement of collar 852 with respect to collar 854.

Figure 14:
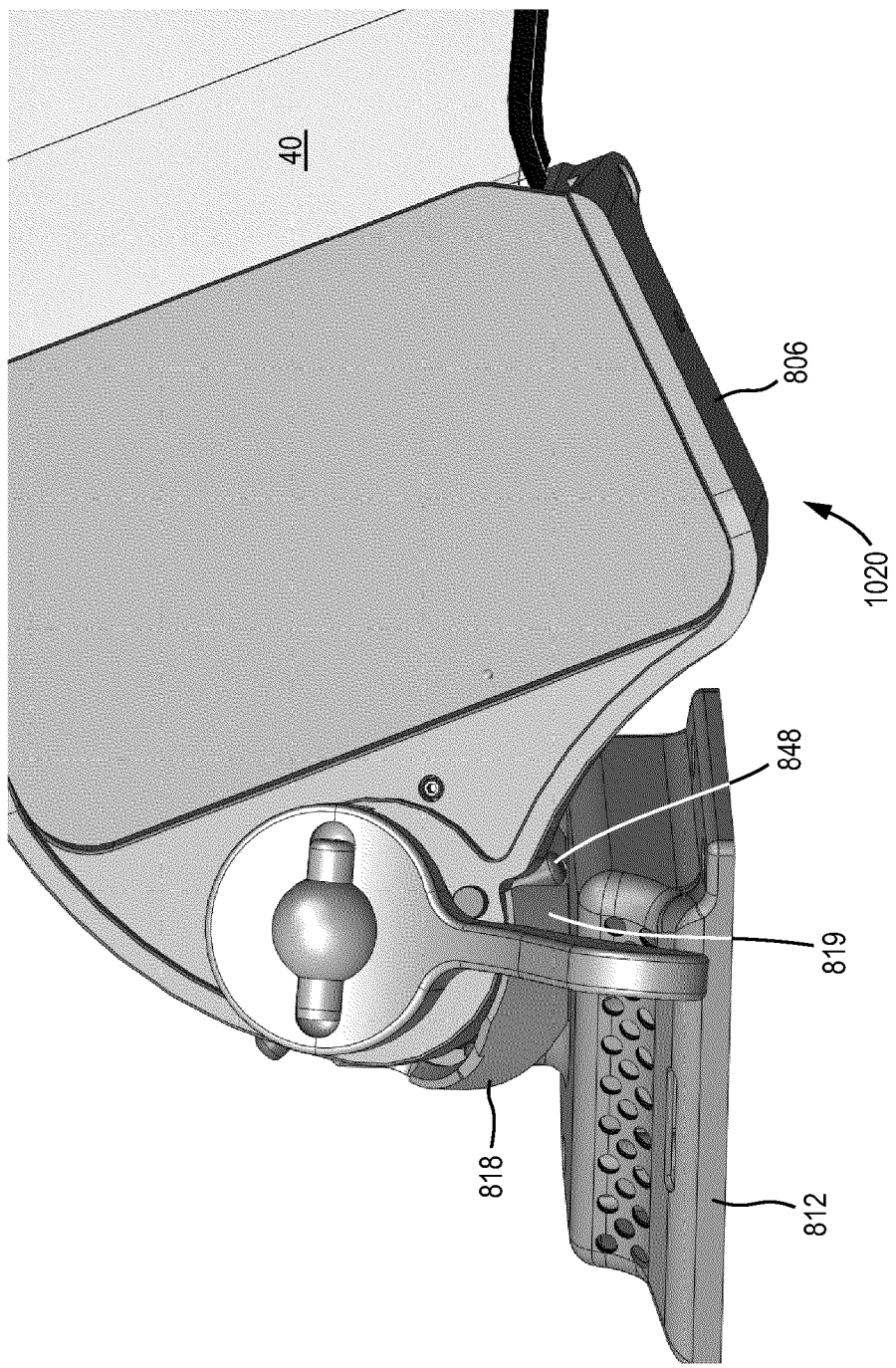
FIG. 14 is another perspective view schematic drawing showing the HUD system illustrated in FIG. 1 including the stow mechanism illustrated in FIG. 8 in a stow position in accordance with another exemplary embodiment.

In operational position 1010, .pin member 848 of collar portion 844 engages operational recess 823 and is against tab 918 to lock mechanism 800 in operational position 1010 (FIG. 13). Bearing 851 also engages operational detent 871 of wedge 804 to prevent wedge 804 from moving. In stow position 1020, pin member 848 engages stow recess 819 to lock mechanism 800 in stow position 1020 (FIG. 14). In stow position 1020, bearing 851 engages stowed detent 873 of wedge 804. Stow position 1020 can be aligned with an aircraft canopy away from the pilot's head.

With reference to FIGS. 10-12, combiner arm 806 travels along stow path 1000 to operational position 1010 from stow position 1020 and from operational position 1010 to stow position 1020. A pilot moves substrate waveguide 40 from stow position 1010 to a position 1012 by turning handle 864 to the up or clockwise. Turning handle 864 clockwise when mechanism 800 is in operational position 1010 causes wedge 804 to turn, thereby, moving waveguide 40 to position 1012

Position 1012 places waveguide 40 away from collimator optics 30 and image source 20 (not shown in FIG. 12) so that waveguide 40 can be rotated without engaging the combiner housing for optics 30 and source 20. Rotating handle 864 slides bearing 851 up, but does not disengage operational detent 871. This forces pin 848 up against tab 918. Rotating handle 864 clockwise when mechanism is in position 1010 moves wedge 804 without turning combiner arm 806. Pin 848 disengages operational recess 823 and allows arm 806 to move counter clockwise past position 1012.

At position 1012, tab 841 (FIG. 10) of wedge 804 engages pin 833 and prevents handle 864 from further turning. At position 1012, detent 845 of wedge 804 engages ball bearing 814 to lock wedge 804 in position. At position 1012, the pilot pushes waveguide 40 or combiner arm 806 to the right or counter-clockwise to reach position 1014. Wedge 804 does not move as arm 806 is moved from position 1012 to position 1014.

As position 1014 is reached, pin 936 on combiner arm 806 engages the end of recess groove 932 on handle 864. As position 1014 is reach bearing 851 engages detent 873 on wedge 804 to prevent arm 806 and glass 40 from falling due to gravity. As the pilot continues to rotate arm 806 and glass 40 counter-clockwise to position 1016, both wedge 804 and handle 864 rotate as well. At position 1016, pin 846 hits tab 918 on cam 818, thereby stopping rotation of combiner arm 806 with respect to cam 818 and bearing 814 engages detent 843 on wedge 804. As handle 864 is continued to be rotated, wedge 804 is rotated and pin 848 is brought into stow recess 819 as combiner arm 806 reaches stow position 1020 in line with the canopy of the cockpit. Final stow position 1020 is determined when tab 841 of wedge 804 contacts pin 831 of cam 818 and bearing 851 engages stow detent 871 of wedge 804.

Travel along stow path from stowed position 1020 to operational position 1010 follows an opposite operation to that described above with respect to travel from operational position 1010 to stowed position 1020.

Twisting handle 864 in a clockwise direction when mechanism 800 is in stow position 1020 moves wedge 804 clockwise causing combiner arm 806 to reach position 1016. Member 848 disengages from stow recess 819. At position 1014, wedge 804 is locked as tab 841 contacts pin 833. Detent 845 engages bearing 814 to lock wedge 804. The pilot can move combiner arm 806 from position 1014 to position 1012 by moving combiner arm to the left or clockwise. Moving combiner arm from position 1014 to 1012 only moves combiner arm 806 and does not move wedge 804. Handle 864 can be twisted counter-clockwise to move combiner arm 806 from position 1012 to 1010. Combiner arm 806 is not rotated. Pin 848 engages operational recess 823 to lock combiner arm 806 in position 1010.

Ramp 922 associated with operational slot 923 prevents arm from rotating out of operational position 1020. However, twisting handle 864 clockwise pulls pin 848 out of slot 923 and allows it to travel up ramp 922.

In one preferred embodiment, stow mechanism 800 enables substrate waveguide 40 to move out of a pilot's head trajectory path in the event of a breakaway event such as a crash. In a breakaway event, substrate waveguide 40 can pivot about pin 904. A spring steel link 905 between pin 904 and pin 906 (FIG. 9) holds substrate waveguide 40 in the appropriate positions for operation and breakaway. In the event of a breakaway, the bias of spring steel link 905 is overcome and allows the combiner 40 to rotate about pin 904 towards the front of the aircraft and away from the pilot as pin 908 travels through slot 910. As pin 908 travels passed a threshold, the force of link 905 moves waveguide 40 to a breakaway position away from the path of the pilot's during a breakaway event. Link 905 holds waveguide 40 in the breakaway position until a force is applied to overcome link 905 and pin 908 travels back to a top of slot 910 as waveguide 40 is rotated back to its normal position.

The various components of stow mechanism 800 can be manufactured from various materials. Preferably aluminum is utilized as a material.

Although an exemplary stow path 1000 is described herein, stow path may be changed for particular cockpit architectures without departing from the scope of the invention. For example, changes to wedge 804, collar portion 844, and bracket 802 can modify stow path 1000 for particular air frames or cockpits. In addition, although stow mechanism 800 is described as being operated manually, an automated system using motors, solenoids, etc. could move system 10 through stow path 1000 without departing from the scope of the invention.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claims.

What is claimed is:

1. A head up display, comprising:
    a micro display image source;
    collimating optics capable of providing a field of view of at least 30 degrees horizontally by 18 degrees vertically; and
    a combiner, the collimating optics being disposed between the combiner and the image source, the collimating optics providing collimated light associated with the micro display image source, the collimating optics having a compact folded beam path, the combiner receiving the collimated light from the collimating optics at an input and providing the collimated light to an output, the collimated light traveling from the input to the output within the combiner by total internal reflection, wherein an input diffraction grating is disposed in a first area at the input and an output diffraction grating is disposed in a second area at the output, wherein the first area is smaller than the second area by a factor of greater than or equal to 3, wherein the combiner provides pupil expansion in the vertical direction.

2. The head up display of claim 1, wherein the collimating optics are a catadioptric system.

3. The head up display of claim 2, wherein an exit pupil of the combiner is approximately 4 by 4 units and an exit pupil of the collimator is approximately 4 by 1 units.

4. The head up display of claim 1, further comprising:
    a stow mechanism for moving the combiner in at least two degrees freedom when the combiner is moved from a stow position to an operational position.

5. The head up display of claim 1, further comprising:
    display electronics for providing real-time graphics for display on the micro display image source, wherein the real-time graphics comprise a flight vector symbol positioned to overlay the real world scene as viewed by a pilot through the combiner.

6. The head up display of claim 5, wherein the collimating optics are a folded catadioptric system.

7. The head up display of claim 1, wherein the micro display image source is a micro liquid crystal display.

8. The head up display of claim 3, wherein the input diffraction grating and the output diffraction grating are surface relief gratings.

9. The head up display of claim 2, wherein the input diffraction grating receives the collimated light from a corrective lens in the collimating optics.

10. The head up display of claim 1, wherein the combiner is a single piece of transparent glass.

11. A method of displaying information on a head up display, the method comprising:

collimating light from an image source using collimating optics, the collimating optics being a folded catadioptric system capable of providing a field of view of at least 30 degrees horizontally by 18 degrees vertically;

diffracting the collimated light into a transparent substrate waveguide at an input;

propagating the collimated light through the substrate waveguide to an output;

diffracting the collimated light from the substrate waveguide at the output, wherein a pupil is expanded in at least one direction by the substrate waveguide.

12. The method of claim 11, wherein the substrate waveguide operates as a combiner.

13. The method of claim 11, wherein the collimating step is performed by collimating optics having a lens in close proximity to the input.

14. The method of claim 13, wherein the collimating optics include a polarizing beam splitter.

15. The method of claim 11, wherein diffracting steps use surface relief gratings.

16. A head up display for providing an image from an image source, the display comprising:

collimating optics having a first exit aperture of a first size;

a combiner receiving collimated light from the collimating optics at an input and providing the collimated light to an output, the collimating light traveling from the input to the output within the combiner by total internal refraction, wherein the combiner has a second exit aperture of a second size, the second size being larger than the first size; and a stow mechanism for moving the combiner out of a head path in a crash event and for aligning the combiner to the collimating optics when in an operational position and for moving the combiner out of a pilot's view in a stowed position, wherein when moving from the operational position to the stowed position, the combiner rotates in a clockwise or counter clockwise direction when viewed from a position of a pilot.

17. The display of claim 16, wherein the first size has a same width as the second size.

18. The system of claim 17, wherein the second size has a height approximately four times a height of the first size.

19. The system of claim 17, wherein the combiner moves in at least two degrees of freedom as the combiner rotates in the clockwise or counterclockwise direction across a stow path from the operational position to the stowed position.

20. The system of claim 17, wherein the combiner is a substrate waveguide including surface relief diffraction gratings.

* * * * *